Patented Nov. 27, 1951

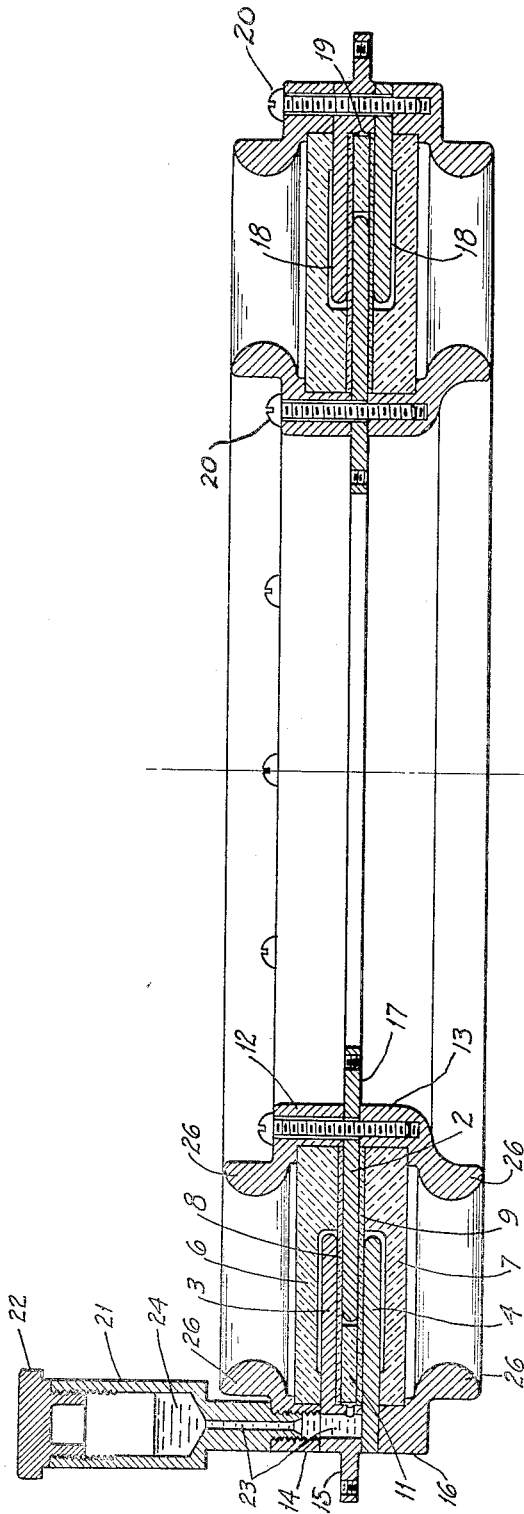

2,576,770

UNITED STATES PATENT OFFICE 2,576,770

CAPACITOR FOR RADIO-FREQUENCY CIRCUITS

Byron O. Ballou, San Bruno, Calif., assignor to Eitel-McCullough, Inc., San Bruno, Calif., a corporation of California Application June 25, 1949, Serial No. 101,347

1 Claim. (Cl. 175—41)

My invention relates to an improved capacitor suitable for blocking direct currents in radio-frequency circuits, such as a blocking capacitor for the D. C. anode voltages of a vacuum tube.

It is among the objects of my invention to provide a capacitor of the character described which will work at the higher frequencies say above 100 mc. and will withstand the higher voltages say above 20 kv.

Another object is to provide a capacitor structure suitable for use in the cavity type circuits frequently employed in conjunction with vacuum tubes at the higher frequencies.

The invention possesses other objects and features of advantage, some of which, with the foregoing, will be set forth in the following description of my invention. It is to be understood that I do not limit myself to this disclosure of species of my invention as I may adopt variant embodiments thereof within the scope of the claim.

Referring to the drawings:

The single figure is a vertical sectional view of a capacitor embodying the improvements of my invention.

In terms of broad inclusion, my improved capacitor comprises a set of overlapping metal plates, sheets of solid dielectric interposed between the plates and disposed on opposite sides of the set, a fluid dielectric filling the voids between the plates and sheets, and means for clamping the plates and sheets together. In the preferred structure I also provide a reservoir communicating with the interior of the capacitor for retaining excess fluid dielectric.

In greater detail, the capacitor shown in the drawing is designed for use as a blocking capacitor in the anode circuit of a vacuum tube radio-frequency generator. While my improvements may be incorporated in capacitors having a variety of shapes, the particular structure shown is of annular configuration so as to surround the anode of the tube in a manner suitable for use in conjunction with a cavity type circuit, as will be appreciated by those skilled in the art.

The capacitor comprises a set of say three overlapping circular metal plates 2, 3 and 4, the amount of overlap and spacing between the plates being determined by the capacitance desired. In its operating position the capacitor surrounds the anode of a tube (not shown) and the internal diameter of the capacitor is made large enough to receive the tube. Plates 2, 3 and 4 may be of any suitable metal such as brass and are shaped as flat rings, it being understood that any number of these plates may be employed as needed to build up the capacitance desired.

The plates are separated and enclosed at opposite sides by sheets of solid dielectric, such as the outer sheets 6 and 7, the spacer sheets 8 and 9, and the inner sheet 11. These sheets of solid dielectric are also ring-shaped and are formed to fit with the various plates as illustrated. Any solid dielectric material having a fairly high dielectric constant may be employed, of which there are several organic compounds such as polystyrene now commonly used for this purpose.

In order to withstand higher voltage gradients, the plates 2, 3 and 4 are overlapped only along their inner portions to provide adequate spacing between the inner ends of the plates and the outer terminal portions of the capacitor structure. These spaces are then occupied by the solid dielectric, as by the inner ring 11 at the end of plate 2 and the inwardly extending portions of rings 6 and 7 adjacent the end of plates 3 and 4.

Means are provided for clamping the metal plates and dielectric sheets together into a unitary structural body. This is accomplished by an inner pair of clamping rings 12 and 13 and a similar pair of outer clamping rings 14 and 16, which rings may be of any suitable metal such as brass. These rings also form the end walls of the structure and provide terminals for the capacitor. For convenience of making terminal connections and mounting the capacitor the plates 2 and 3 preferably extend through the end walls to provide mounting flanges 16 and 17. The end rings are recessed to form lips for engaging the peripheral edges of the upper and lower sheets 6 and 7, and suitable screws 20 are positioned about the circumference of the structure for clamping the several rings together.

In a capacitor of this kind it is necessary to avoid air gaps within the structure, otherwise internal breakdown across the gaps will occur. Even though the parts are carefully made and clamped tightly together a certain number of small voids will inevitably occur between the metal plates and solid dielectric sheets. In order to overcome this problem I provide a fluid dielectric in the structure to insure that all such voids will be filled. This dielectric may be one of the commonly known silicone compounds, preferably of a grease-like consistency. An excess amount of this grease is wiped on the inner surfaces of the parts prior to assembly so that when the elements are subsequently clamped together the fluid dielectric will flow to completely fill all voids and expel any trapped air as the parts are compressed.

Suitable channels are preferably provided within the structure to facilitate the flow of the fluid dielectric along the inner surfaces, such as passages 18 formed by relieving the sheets 6 and 7 along the plates 3 and 4 and the groove 19 cut in plate 3 about the periphery of the inner circular sheet 11. A reservoir is also preferably provided communicating with the interior voids for retaining excess fluid dielectric. For this purpose a cup 21 having a closure 22 is mounted on one of the retaining rings 14 with a passage 23 leading from the reservoir to the inner groove 19. The excess fluid dielectric 24 may thus escape into the reservoir when the parts are clamped together. Another important advantage of this feature is that the reserve fluid dielectric may subsequently be drawn back into the structure in event the void spaces increase due to expansion of the parts under heat during operation of the capacitor. Complete embedding of the plates within materials of high dielectric constant is thus insured to prevent internal breakdown of the capacitor.

Another factor enabling my improved capacitor to withstand high voltages is that the outer solid dielectric sheets 6 and 7 extend the full distance between the end terminals, thus presenting the maximum surface path to air from terminal to terminal. The breakdown condition along these outer surfaces can be still further improved by providing corona shields 26 which may be formed as part of the end rings.

The capacitor may be used to advantage in a variety of places in radio-frequency circuits, the particular annular shape shown being well adapted to fit with cavity type circuits employed with vacuum tubes as oscillators or amplifiers in the higher frequency ranges, say above 100 mc. Examples of such uses are blocking capacitors for isolating the D. C. voltages such as the anode and grid bias voltages. As an anode voltage blocking device the capacitor is preferably located to surround the tube with the anode connected to the inner terminal flange 17. The outer terminal flange 15 is connected to a conductor of the anode tank circuit. In cavity type circuits the resonant cavities are circular in shape so that the annular capacitor nicely fits the geometrical arrangements involved.

Since the capacitor structure is very compact it is ideal for high frequency circuits where dimensions are limited by the frequency. The ability to withstand high voltages is especially important in the case of an anode blocking capacitor where high plate voltages, say of the order of 20 kv. or more are involved, as in plate pulsed tube applications.

I claim:

A high voltage capacitor for radio-frequency circuits subject to temperature variations comprising a set of overlapping circular metal plates, circular sheets of solid dielectric interposed between the plates and disposed on opposite sides of said set, a fluid dielectric filling the voids between the plates and sheets, means including metal rings engaging the outer sheets for clamping the plates and sheets together, said rings and plates and outer sheets forming a casing for confining the fluid dielectric, a reservoir on one of the rings for holding excess fluid dielectric, a passage connecting the reservoir with the interior of said casing, and channels along the interior surfaces of the plates and sheets to facilitate flow of said fluid dielectric between the reservoir and said voids within the casing upon expansion and contraction of the parts with temperature variations.

BYRON O. BALLOU.

REFERENCES CITED

The following references are of record in the file of this patent:

UNITED STATES PATENTS

| Number | Name | Date |
|---|---|---|
| 587,114 | Bradley | July 27, 1897 |
| 1,754,268 | Dubilier | Apr. 15, 1930 |
| 1,790,718 | Palueff | Feb. 3, 1931 |
| 1,967,653 | Austin | July 24, 1934 |
| 2,348,693 | Minnium | May 9, 1944 |
| 2,427,563 | Lavoie | Sept. 16, 1947 |
| 2,460,033 | Roberds | Jan. 25, 1949 |

FOREIGN PATENTS

| Number | Country | Date |
|---|---|---|
| 216,901 | Great Britain | July 2, 1925 |